(12) United States Patent
Hou et al.

(10) Patent No.: US 7,174,407 B2
(45) Date of Patent: Feb. 6, 2007

(54) EXTENDABLE COMPUTER SYSTEM

(75) Inventors: Ren-Ting Hou, Taipei Hsien (TW);
Zhong-Li Lai, Taipei Hsien (TW);
Yi-Tai Liu, Taipei Hsien (TW)

(73) Assignee: Wistron Corporation, Hsi-Chih (TW)

( * ) Notice: Subject to any disclaimer, the term of this patent is extended or adjusted under 35 U.S.C. 154(b) by 390 days.

(21) Appl. No.: 10/707,860

(22) Filed: Jan. 19, 2004

(65) Prior Publication Data
US 2005/0079743 A1 Apr. 14, 2005

(30) Foreign Application Priority Data
Oct. 14, 2003 (TW) ............................... 92218273 U (51) Int. Cl.
*G06F 13/00* (2006.01)
(52) U.S. Cl. ...................... 710/301; 710/302; 710/313; 710/315
(58) Field of Classification Search ................ 710/300, 710/301–306, 311–315
See application file for complete search history.

(56) References Cited

U.S. PATENT DOCUMENTS

| 6,769,035 B1 * | 7/2004 | Garreau ........................ 710/14 |
| 2004/0003154 A1 * | 1/2004 | Harris et al. ................. 710/300 |
| 2004/0019729 A1 * | 1/2004 | Kelley et al. ................ 710/306 |
| 2005/0034045 A1 * | 2/2005 | Lueck et al. ................. 714/746 |
| 2005/0120153 A1 * | 6/2005 | Perez et al. .................... 710/62 |

OTHER PUBLICATIONS

Intel Demos PCI Express Chips. Light Reading, Sep. 18, 2003.*
Intel 41210 Serial to Parallel PCI Bridge Product Brief.*
PCI Express Extensions Beyond the Motherboard Chipset, RTC Magazine.*
Selecting PCI Express IP for Your Design, Stephen Peltan, DesignWare Technical Bulletin.*
PCI Express: Interconnect of the Future, AnandTech, Jun. 12, 2003.*
PCI-X Bus Description, Interfacebus.com.*
PCI-Express Bus Description, Interfacebus.com.*
Intel RAID Controller SRCSAS18E, Product Brief.*
PCI Express and PCI-X Riser Card, Rackmountmart.com.*
PCI Express Base Specification, Revision 1.0, pp. 31-42 and 97-98, Apr. 29, 2002.*

* cited by examiner

*Primary Examiner*—Khanh Dang
(74) *Attorney, Agent, or Firm*—Winston Hsu (57) ABSTRACT

The present invention provides an extendable computer system including a motherboard for maintaining the functionality of the computer system. The motherboard includes a system chipset and a first extending port electrically connected to the system chipset for extending functionality of the motherboard. The extendable computer system further includes an extended board capable of electrically connecting to the motherboard for extending the functionality of the computer system. The extended board includes a second extending port capable of electrically connecting to the first extending port for electrically connecting the extended board to the system chipset of the computer system, wherein the extending ports consist of a Golden Finger Slot and a matched Golden Finger, and the extended board and the motherboard are aligned in the same plane through the connection of the extending ports.

6 Claims, 4 Drawing Sheets

EXTENDABLE COMPUTER SYSTEM

BACKGROUND OF INVENTION

1. Field of the Invention

The present invention relates to an extendable computer system, and more particularly, to an extendable computer system having an extended board and a motherboard aligned in the same plane.

2. Description of the Prior Art

The functionality of computer systems is constantly increasing along with its application fields. To take advantage of new functionalities, it is common to extend the functionality of the original specification of a computer system using a circuit board, such as an interface card, inserted perpendicularly into a standard communication interface slot of the motherboard of the computer system. Other methods in addition to the above-mentioned include replacing the motherboard of the computer system with another motherboard of a better specification or buying a new computer system altogether.

The three options listed above, however, are not without disadvantages for either the user or manufacturer. The first and third options are not that attractive for users. The third option of buying a new computer system obviously has an expense disadvantage while the first method of perpendicularly inserting the circuit board into the standard communication interface slot of the motherboard of the original computer system can be inconvenient for users especially in the area of server applications.

When extending the computer system of a server system, the exterior case in most cases needs to be replaced with a new one corresponding to the height of the perpendicularly inserted interface card, which increases the total height of the server system. In some cases, users who anticipate changes later may choose to install cases of large height to begin with so as to prevent the inconvenience of changing the cases. In addition to inefficient use of space, the addition of a card inserted perpendicularly occupies a slot on the motherboard, which could be used for other peripherals.

As a result, the second option of replacing the motherboard may prove to be the most attractive to a user. However, for manufacturers this can be a disadvantage. The motherboards that manufacturers produce fall into one of two categories: modified or newly designed. Modified motherboards are motherboards that are built by modifying designs of existing motherboards whereas new designed motherboards are motherboards that have been built from scratch. There is no disadvantage with the making of newly designed motherboards as manufactures will always be designing new boards.

However, certain segment of users who do not want to purchase a completely new motherboard. This segment, instead, wants an updated version of the motherboard they are currently using. In addition, this segment may also be unwilling to switch to something completely new and having to relearn everything.

However, the disadvantage of modification for manufacturers is as follows. When manufacturers elect to provide replacement motherboards with better specifications by modifying the design of an existing motherboard, they have to extend the size or increase the number of layers of the existing motherboard with the original specification. Modification also requires almost the same amount of effort as designing a new product during design and production phases, meaning that related design and production costs cannot be reduced. Furthermore, as requirement of the above-mentioned design modification comes, the uncertainty of whether or not the mass production of the motherboard with the original specification will continue according to the originally planned product cycle schedule increases.

SUMMARY OF INVENTION

It is therefore a primary objective of the claimed invention to provide an extendable computer system to solve the above-mentioned problem.

According to the first embodiment, the present invention provides an extendable computer system including a motherboard for maintaining the functionality of the computer system. The motherboard includes: a system chipset for supporting a specification of a first interface; at least one first standard communication interface slot electrically connected to the system chipset for electrically connecting at least one peripheral device to the computer system; and a first extending port electrically connected to the system chipset for extending functionality of the motherboard.

The extendable computer system further includes an extended board capable of electrically connecting to the motherboard for extending the functionality of the computer system. The extended board includes: a second extending port capable of electrically connecting to the first extending port for electrically connecting the extended board to the system chipset of the motherboard, wherein at least one end of the second extending port is in accordance with the specification of the first interface; and at least one second standard communication interface slot electrically connected to the at least one end of the second extending port for electrically connecting at least one peripheral device to the computer system, wherein the at least one second standard communication interface slot is in accordance with the specification of the first interface. In addition, the extending ports consist of a Golden Finger Slot and a matched Golden Finger, and the extended board and the motherboard are aligned in the same plane through the connection of the extending ports.

According to the second embodiment, the present invention further provides an extendable computer system including a motherboard for maintaining the functionality of the computer system. The motherboard includes: a system chipset for supporting a specification of a first interface; at least one first standard communication interface slot electrically connected to the system chipset for electrically connecting at least one peripheral device to the computer system; and a first extending port electrically connected to the system chipset for extending functionality of the motherboard.

The extendable computer system further includes an extended board capable of electrically connecting to the motherboard for extending the functionality of the computer system. The extended board includes: a second extending port capable of electrically connecting to the first extending port for electrically connecting the extended board to the system chipset of the motherboard, wherein at least one end of the second extending port is in accordance with the specification of the first interface; a second interface converter electrically connected to the at least one end of the second extending port for converting the first interface into a second interface; and at least one second standard communication interface slot electrically connected to the second interface converter for electrically connecting at least one peripheral device to the computer system, wherein the at least one second standard communication interface slot is in accordance with the specification of the second interface. In addition, the extending ports consist of a Golden Finger Slot and a matched Golden Finger, and the extended board and the motherboard are aligned in the same plane through the connection of the extending ports.

According to another embodiment, the present invention further provides an extendable computer system including a motherboard for maintaining the functionality of the computer system. The motherboard includes: a system chipset for supporting a specification of a first interface; at least one first standard communication interface slot electrically connected to the system chipset for electrically connecting at least one peripheral device to the computer system; and a first extending port electrically connected to the system chipset for extending functionality of the motherboard.

The extendable computer system further includes an extended board capable of electrically connecting to the motherboard for extending the functionality of the computer system. The extended board includes: a second extending port capable of electrically connecting to the first extending port for electrically connecting the extended board to the system chipset of the motherboard, wherein at least one end of the second extending port is in accordance with the specification of the first interface; a second interface converter electrically connected to the at least one end of the second extending port for converting the first interface into a second interface; a third interface converter electrically connected to the second interface converter for converting the second interface into a third interface; and at least one third standard communication interface slot electrically connected to the third interface converter for electrically connecting at least one peripheral device to the computer system, wherein the at least one third standard communication interface slot is in accordance with the specification of the third interface. In addition, the extending ports consist of a Golden Finger Slot and a matched Golden Finger, and the extended board and the motherboard are aligned in the same plane through the connection of the extending ports.

One of the advantages of the present invention is that, when extending the functionality of the extendable computer system of the present invention, those skilled in the art may electrically connect the extended board to the motherboard of the computer system rather than extending the size or increasing the number of layers of the motherboard to modify the design of the computer system. Therefore, related design and production costs can be reduced.

Another advantage of the present invention is that, the extending ports consist of a Golden Finger Slot and a matched Golden Finger, and the extended board and the motherboard are aligned in the same plane through the connection of the extending ports. This means that the server application of the extendable computer system of the present invention is quite flexible and the prior art problem of increasing the total height of the server system while extending the functionality of the computer system will not occur. Therefore, the space utilization efficiency is increased.

Another advantage of the present invention is that, while extending the functionality of the extendable computer system, the extended board will not occupy any standard communication interface slot of the motherboard. Therefore, the total standard communication interface slot number available and the corresponding space will not be wasted.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
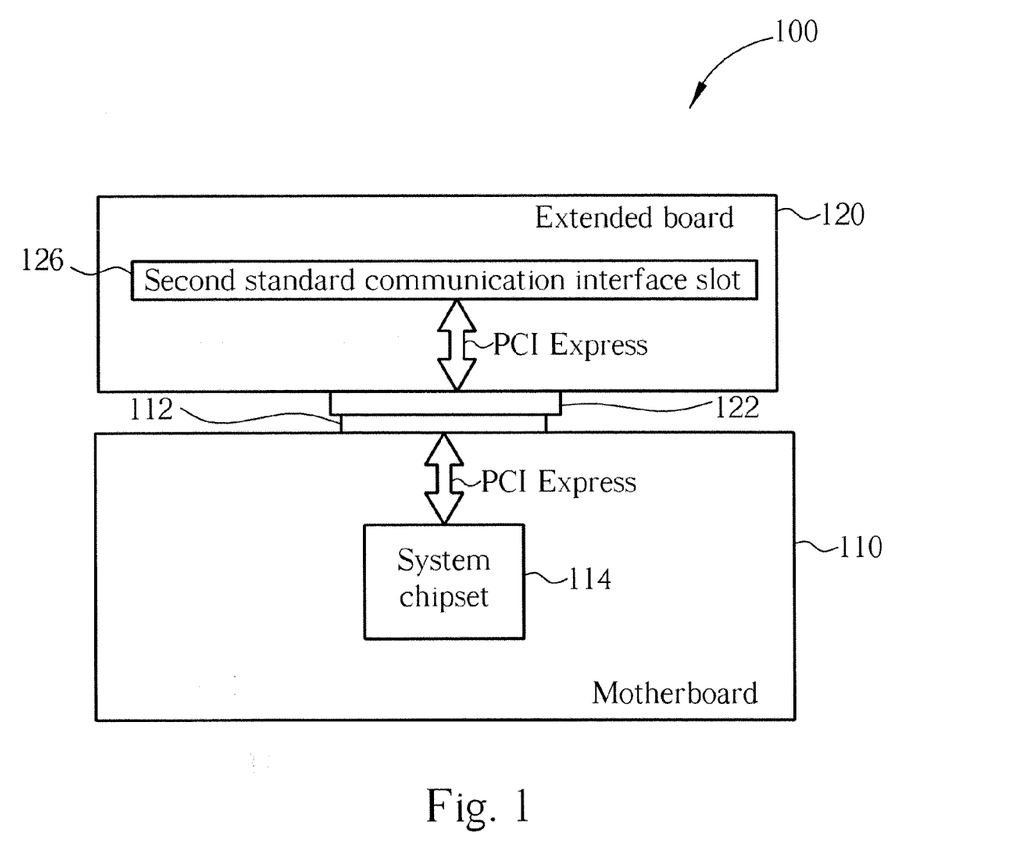
FIG. 1 is a block diagram of the first embodiment of an extendable computer system according to the present invention.

Please refer to FIG. 1 showing a block diagram of the first embodiment of an extendable computer system according to the present invention. The present invention provides an extendable computer system 100 comprising a motherboard 110 for maintaining the functionality of the computer system 100. The motherboard 110 comprises a system chipset 114, which is a North Bridge chipset or a South Bridge chipset in this embodiment, for supporting a specification of a first interface, which is a PCI (Peripheral Component Interconnect) Express interface in this embodiment. The motherboard 110 further comprises at least one first standard communication interface slot (not shown in FIG. 1) electrically connected to the system chipset 114 for electrically connecting at least one peripheral device to the computer system 100. The motherboard 110 further comprises a first extending port 112 electrically connected to the system chipset 114 for extending functionality of the motherboard 110.

The extendable computer system 100 further comprises an extended board 120 capable of electrically connecting to the motherboard 110 for extending the functionality of the computer system 100. The extended board 120 comprises a second extending port 122 capable of electrically connecting to the first extending port 112 for electrically connecting the extended board 120 to the system chipset 114 of the motherboard 110, wherein at least one end (not shown in FIG. 1) of the second extending port 122 is in accordance with the specification of the first interface. The extended board 120 further comprises at least one second standard communication interface slot 126 electrically connected to the at least one end of the second extending port 122 for electrically connecting at least one peripheral device to the computer system 100, wherein the at least one second standard communication interface slot 126 is in accordance with the specification of the first interface. The extending ports 112, 122, which are different from the afore-mentioned standard communication interface slots, consist of a Golden Finger Slot and a matched Golden Finger. In this embodiment, the second extending port 122 is the Golden Finger Slot 122 while the first extending port 112 is the matched Golden Finger 112. Furthermore, the extended board 120 and the motherboard 110 are aligned in the same plane through the connection of the extending ports 112, 122.

Figure 2:
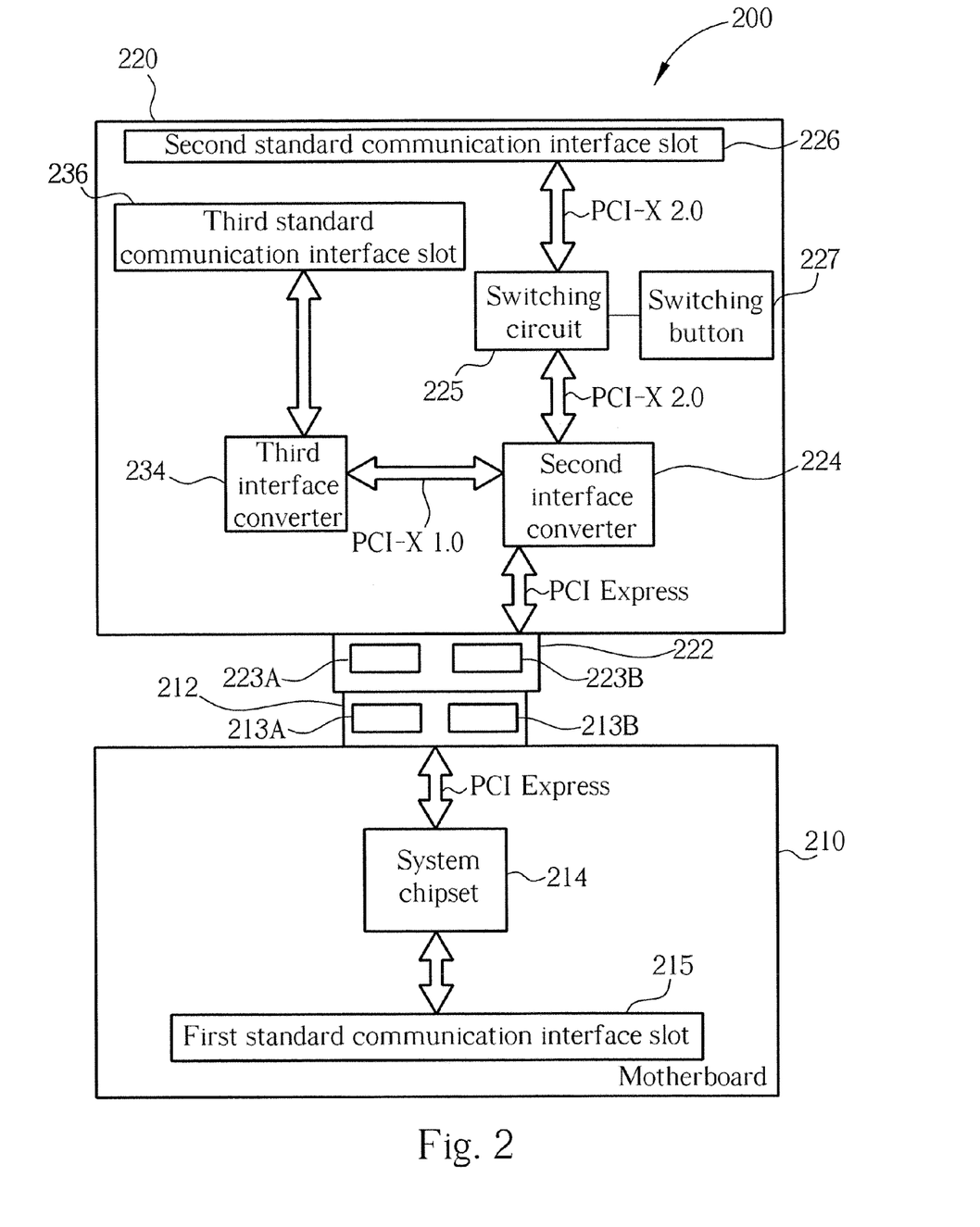
FIG. 2 is a block diagram of the second embodiment of an extendable computer system according to the present invention.

Please refer to F*ig.* 2 showing a block diagram of the second embodiment of the extendable computer system according to the present invention. The present invention provides an extendable computer system 200 comprising a motherboard 210 for maintaining the functionality of the computer system 200. The motherboard 210 comprises a system chipset 214, which is a North Bridge chipset or a South Bridge chipset in this embodiment, for supporting a specification of a first interface, which is a PCI Express interface in this embodiment. The motherboard 210 further comprises at least one first standard communication interface slot 215 electrically connected to the system chipset 214 for electrically connecting at least one peripheral device to the computer system 200. The motherboard 210 further comprises a first extending port 212 electrically connected to the system chipset 214 for extending functionality of the motherboard 210.

The extendable computer system 200 further comprises an extended board 220 capable of electrically connecting to the motherboard 210 for extending the functionality of the computer system 200. The extended board 220 comprises a second extending port 222 capable of electrically connecting to the first extending port 212 for electrically connecting the extended board 220 to the system chipset 214 of the motherboard 210, wherein at least one end (not shown in FIG. 2) of the second extending port 222 is in accordance with the specification of the first interface. The extended board 220 further comprises a second interface converter 224, which is a PCI-Express/PCI-X interface converter and shown by its chipset model "PXH-D" in FIG. 2, electrically connected to the at least one end of the second extending port 222 for converting the first interface into a second interface, which is a PCI-X interface in this embodiment. The second interface converter 224 supports both versions 1.0, 2.0 of the PCI-X interface specification. That is, the second interface converter 224 is both PCI-X 1.0 and PCI-X 2.0 compliant. The extended board 220 further comprises at least one second standard communication interface slot 226 electrically connected to the second interface converter 224 for electrically connecting at least one peripheral device to the computer system 200, wherein the at least one second standard communication interface slot 226 is in accordance with the specification of the second interface, which is the PCI-X interface in this embodiment, and more particularly, in accordance with the specification of the PCI-X 2.0 interface in this embodiment. The extending ports 212, 222, which are different from the afore-mentioned standard communication interface slots, consist of a Golden Finger Slot and a matched Golden Finger. In this embodiment, the second extending port 222 is the Golden Finger Slot 222 while the first extending port 212 is the matched Golden Finger 212. Furthermore, the extended board 220 and the motherboard 210 are aligned in the same plane through the connection of the extending ports 212, 222.

As shown in FIG. 2, the extended board 220 of this embodiment further comprises a third interface converter 234 electrically connected to the second interface converter 224 for converting the second interface, which is the PCI-X interface in this embodiment, into a third interface, and more particularly, for converting the PCI-X 1.0 interface into the third interface in this embodiment. The extended board 220 further comprises at least one third standard communication interface slot 236 electrically connected to the third interface converter 234 for electrically connecting at least one peripheral device to the computer system 200, wherein the at least one third standard communication interface slot 236 is in accordance with the specification of the third interface. In this embodiment, the third interface converter 234 is a RAID (Redundant Array of Independent Disks) controller or a SCSI (Small Computer System Interface) controller.

In this embodiment, the extended board 220 further comprises at least one switching circuit 225, for performing Hot-Plug control and power management of the at least one second standard communication interface slot 226, electrically connected to the second interface converter 224 and the at least one second standard communication interface slot 226. The extended board 220 further comprises at least one switching button 227, such as a manual switch or a push-button, electrically connected to the at least one switching circuit 225 for controlling the at least one switching circuit 225 to switch on or switch off the protocol, data signals, and power of the at least one second standard communication interface slot 226.The installation of the above-mentioned at least one switching circuit 225 and the corresponding switching button 227 of the second embodiment is a choice of implementation of the present invention, and thus, not a limitation.

Please refer to FIG. 2 again. The third embodiment of the present invention will be described as follows using FIG. 2. The related components and the corresponding functionality of the third embodiment are similar to those of the second embodiment, but the installation of the at least one switching circuit 225 of the third embodiment is different from that of the second embodiment and a switching button such as that of the second embodiment is unnecessary in the third embodiment. The difference is described as follows.

The first extending port 212 further comprises at least one first power management end set 213A electrically connected to the power management chipset, such as the afore-mentioned South Bridge chipset of the computer system 200 for transmitting at least one power management signal and at least one monitoring signal. The extended board 220 further comprises at least one switching circuit 225 electrically connected to the second interface converter 224 and the at least one second standard communication interface slot 226 for performing Hot-Plug control and power management of the at least one second standard communication interface slot 226. The at least one switching circuit 225 is also electrically connected to the at least one first power management end set 213A through at least one second power management end set 223A of the second extending port 222. Please note that the power management chipset is capable of controlling and monitoring the Hot-Plug control and the power management of the at least one second standard communication interface slot 226 with the at least one switching circuit 225, and the second interface converter 224 is capable of controlling the at least one switching circuit 225 with a protocol of the second interface to switch on or switch off the protocol and data signals of the at least one second standard communication interface slot 226 when receiving the at least one power management signal. Also, the installation of the above-mentioned at least one switching circuit 225 and the corresponding switching button 227 of the second embodiment, together with the related variance of the third embodiment, are choices of implementation of the present invention, and thus not a limitation.

Please refer to FIG. 2 again. The fourth embodiment of the present invention will be described as follows using FIG. 2. The related components and the corresponding functionality of the fourth embodiment are similar to those of the second embodiment, but the installation of the at least one switching circuit 225 of the fourth embodiment is different from that of the second embodiment and a switching button such as that of the second embodiment is unnecessary in the fourth embodiment. The difference is described as follows.

The first extending port 212 further comprises at least one first monitoring end 213B electrically connected to a power management chipset, such as the afore-mentioned South Bridge chipset, of the computer system 200 for transmitting at least one Hot-Plug/Power Switch monitoring signal. The extended board 220 further comprises at least one switching circuit 225 electrically connected to the second interface converter 224 and the at least one second standard communication interface slot 226 for performing Hot-Plug control and power management of the at least one second standard communication interface slot 226. The at least one switching circuit 225 is also electrically connected to the at least one first monitoring end 213B through at least one second monitoring end 223B of the second extending port 222. In addition, the second interface converter 224 is capable of controlling the at least one switching circuit 225 with a protocol of the second interface to switch on or switch off the protocol, data signals, and power of the at least one second standard communication interface slot 226.

Figure 3:
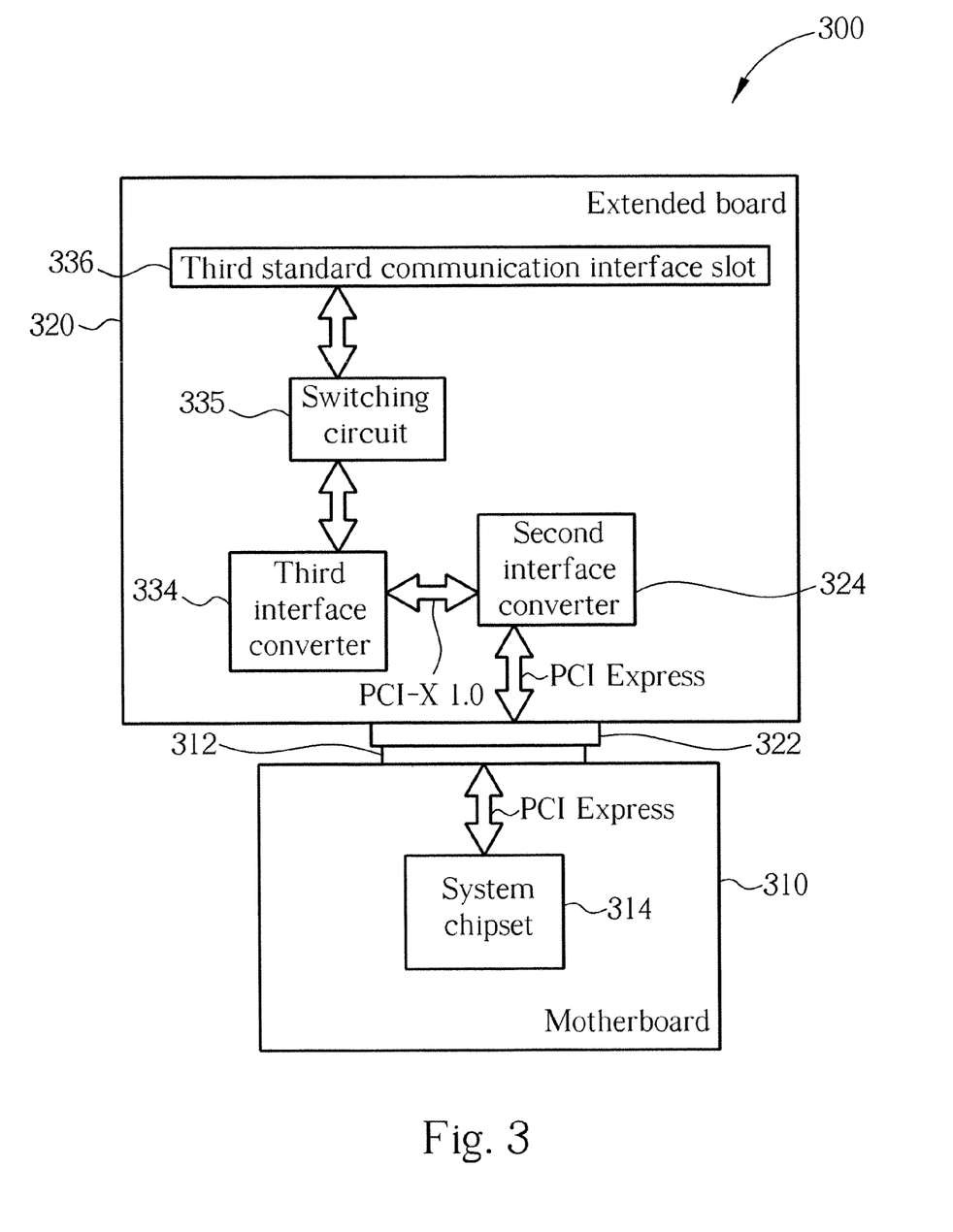
FIG. 3 is a block diagram of another embodiment of an extendable computer system according to the present invention.

Please refer to FIG. 3 showing a block diagram of the fifth embodiment of an extendable computer system according to the present invention. The present invention provides an extendable computer system 300 comprising a motherboard 310 for maintaining the functionality of the computer system 300. The motherboard 310 comprises a system chipset 314, which is a North Bridge chipset or a South Bridge chipset in this embodiment, for supporting a specification of a first interface, which is a PCI Express interface in this embodiment. The motherboard 310 further comprises at least one first standard communication interface slot (not shown in FIG. 3) electrically connected to the system chipset 314 for electrically connecting at least one peripheral device to the computer system 300. The motherboard 310 further comprises a first extending port 310 electrically connected to the system chipset 314 for extending functionality of the motherboard 310.

The extendable computer system 300 further comprises an extended board 320 capable of electrically connecting to the motherboard 310 for extending the functionality of the computer system 300. The extended board 320 comprises a second extending port 322 capable of electrically connecting to the first extending port 312 for electrically connecting the extended board 320 to the system chipset 314 of the motherboard 310. Wherein at least one end (not shown in FIG. 3) of the second extending port 322 is in accordance with the specification of the first interface. The extended board 320 further comprises a second interface converter 324, which is a PCI-Express/PCI-X interface converter and shown by its chipset model "PXH-D" in FIG. 3, electrically connected to the at least one end of the second extending port 322 for converting the first interface into a second interface, which is a PCI-X 1.0 interface in this embodiment. The extended board 320 further comprises a third interface converter 334, which is a RAID controller or a SCSI controller in this embodiment, electrically connected to the second interface converter 324 for converting the second interface into a third interface. The extended board 320 further comprises at least one third standard communication interface slot 336 electrically connected to the third interface converter 334 for electrically connecting at least one peripheral device to the computer system 300, wherein the at least one third standard communication interface slot 336 is in accordance with the specification of the third interface. The extending ports 312, 322, which are different from the aforementioned standard communication interface slots, consist of a Golden Finger Slot and a matched Golden Finger. In this embodiment, the second extending port 322 is the Golden Finger Slot 322 while the first extending port 312 is the matched Golden Finger 312. Furthermore, the extended board 320 and the motherboard 310 are aligned in the same plane through the connection of the extending ports 312, 322.

In this embodiment, the extended board 320 further comprises at least one switching circuit 335, for performing Hot-Plug control and power management of the at least one third standard communication interface slot 336, electrically connected to the third interface converter 334 and the at least one third standard communication interface slot 336. The extended board 320 further comprises at least one switching button (not shown in FIG. 3), such as a manual switch or a push-button, electrically connected to the at least one switching circuit 335 for controlling the at least one switching circuit 335 to switch on or switch off the protocol, data signals, and power of the at least one third standard communication interface slot 336.

The installation of the above-mentioned at least one switching circuit 335 and the corresponding switching button of the fifth embodiment is a choice of implementation of the present invention, and this is not a limitation. Please refer to FIG. 3 again. The sixth embodiment of the present invention will be described as follows using FIG. 3. The related components and the corresponding functionality of the sixth embodiment are similar to those of the fifth embodiment, but the installation of the at least one switching circuit 335 of the sixth embodiment is different from that of the fifth embodiment and a switching button such as that of the fifth embodiment is unnecessary in the sixth embodiment. The difference is described as follows.

The first extending port 312 further comprises at least one first power management end set (not shown in FIG. 3) electrically connected to the power management chipset, such as the afore-mentioned South Bridge chipset, of the computer system 300 for transmitting at least one power management signal and at least one monitoring signal. The extended board 320 further comprises at least one switching circuit 335 electrically connected to the third interface converter 334 and the at least one third standard communication interface slot 336 for performing Hot-Plug control and power management of the at least one third standard communication interface slot 336. The at least one switching circuit 335 is also electrically connected to the at least one first power management end set through at least one second power management end set (not shown in FIG. 3) of the second extending port 322. In addition, the power management chipset is capable of controlling and monitoring the Hot-Plug control and the power management of the at least one third standard communication interface slot 336 with the at least one switching circuit 335, and the third interface converter 334 is capable of controlling the at least one switching circuit 335 with a protocol of the third interface to switch on or switch off the protocol and data signals of the at least one third standard communication interface slot 336 when receiving the at least one power management signal.

Figure 4:
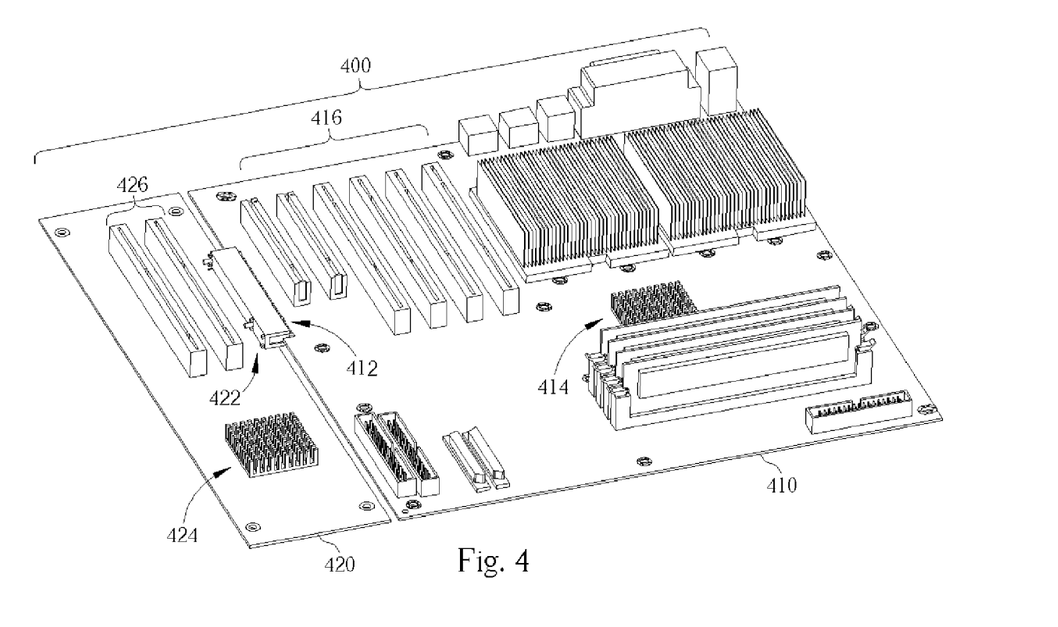
FIG. 4 is an assembly diagram of an extended board and a motherboard of the extendable computer system of the present invention.

Please refer to FIG. 4. FIG. 4 is an assembly diagram of an extended board and a motherboard of the extendable computer system of the present invention. Substantially, FIG. 4 is a mechanical structure design diagram illustrating that the extended board 420 and the motherboard 410 are aligned in the same plane through the connection of the extending ports 412, 422. In this embodiment, the second extending port 422 is the Golden Finger Slot 422 while the first extending port 412 is the matched Golden Finger 412. It is obvious that, the server application of the extendable computer system of the present invention is quite flexible and the prior art problem of increasing the total height of the server system while extending the functionality of the computer system 400 will not occur. Therefore, the space utilization efficiency is increased. Furthermore, the extending ports 412, 422 are different from the at least one first standard communication interface slot 416, which is shown as the plurality of first standard communication interface slots 416 in FIG. 4, of the motherboard 410. As a result, while extending the functionality of the extendable computer system 400, the extended board 420 will not occupy any standard communication interface slot 416 of the motherboard 410. Therefore, the total standard communication interface slot number available to the motherboard 410 and the corresponding space will not be wasted.

In contrast to the prior art, when extending the functionality of the extendable computer system of the present invention, those skilled in the art may electrically connect the extended board to the motherboard of the computer system rather than extending the size or increasing the number of layers of the motherboard to modify the design of the computer system. Therefore, related design and production costs can be reduced.

Another advantage of the present invention is that, the extending ports consist of a Golden Finger Slot and a matched Golden Finger, and the extended board and the motherboard are aligned in the same plane through the connection of the extending ports, so that the server application of the extendable computer system of the present invention is quite flexible and the prior art problem of increasing the total height of the server system while extending the functionality of the computer system will not occur. Therefore, the space utilization efficiency is increased.

Another advantage of the present invention is that, while extending the functionality of the extendable computer system, the extended board will not occupy any standard communication interface slot of the motherboard. Therefore, the total standard communication interface slot number available and the corresponding space will not be wasted.

Those skilled in the art will readily observe that numerous modifications and alterations of the device may be made while retaining the teachings of the invention. Accordingly, the above disclosure should be construed as limited only by the metes and bounds of the appended claims.

The invention claimed is:

1. An extendable computer system comprising:
a motherboard for maintaining the functionality of the computer system, the motherboard comprising:
a system chipset for supporting a specification of a first interface;
at least one first standard communication interface slot electrically connected to the system chipset for electrically connecting at least one peripheral device to the computer system; and
a first extending port electrically connected to the system chipset for extending functionality of the motherboard, the first extending port comprising at least one first monitoring end electrically connected to the system chipset of the computer system for transmitting at least one Hot-Plug/Power Switch monitoring signal; and
an extended board capable of electrically connecting to the motherboard for extending the functionality of the computer system, the extended board comprising:
a second extending port capable of electrically connecting to the first extending port for electrically connecting the extended board to the system chipset of the motherboard, wherein at least one end of the second extending port is in accordance with the specification of the first interface;
a second interface converter electrically connected to the at least one end of the second extending port for converting the first interface into a second interface;
at least one second standard communication interface slot electrically connected to the second interface converter for electrically connecting at least one peripheral device to the computer system, wherein the at least one second standard communication interface slot is in accordance with the specification of the second interface; and
at least one switching circuit, for performing Hot-Plug control and power management of the at least one second standard communication interface slot, electrically connected to:
the second interface converter and the at least one second standard communication interface slot; and
the at least one first monitoring end through at least one second monitoring end of the second extending port;
wherein the second interface converter is capable of controlling the at least one switching circuit with a protocol of the second interface to switch on or switch off the protocol, data signals, and power of the at least one second standard communication interface slot.

2. The computer system of claim 1 wherein the system chipset is a South Bridge chipset.

3. The computer system of claim 1 wherein the first interface is a PCI Express interface, the second interface is a PCI-X interface, and the second interface converter is a PCI Express/PCI-X interface converter.

4. The computer system of claim 3 wherein the system chipset is a North Bridge chipset or a South Bridge chipset.

5. An extendable computer system comprising:
a motherboard for maintaining the functionality of the computer system, the motherboard comprising:
a system chipset for supporting a specification of a first interface;
at least one first standard communication interface slot electrically connected to the system chipset for electrically connecting at least one peripheral device to the computer system; and
a first extending port electrically connected to the system chipset for extending functionality of the motherboard; and
an extended board capable of electrically connecting to the motherboard for extending the functionality of the computer system, the extended board comprising:
a second extending port capable of electrically connecting to the first extending port for electrically connecting the extended board to the system chipset of the motherboard, wherein at least one end of the second extending port is in accordance with the specification of the first interface;
a second interface converter electrically connected to the at least one end of the second extending port for converting the first interface into a second interface;
at least one second standard communication interface slot electrically connected to the second interface converter for electrically connecting at least one peripheral device to the computer system, wherein the at least one second standard communication interface slot is in accordance with the specification of the second interface;
at least one switching circuit electrically connected to the second interface converter and the at least one second standard communication interface slot for performing Hot-Plug control and power management of the at least one second standard communication interface slot; and at least one switching button electrically connected to the at least one switching circuit for controlling the at least one switching circuit to switch on or switch off the protocol, data signals, and power of the at least one second standard communication interface slot.

6. An extendable computer system comprising:

a motherboard for maintaining the functionality of the computer system, the motherboard comprising:

a system chipset for supporting a specification of a first interface;

at least one first standard communication interface slot electrically connected to the system chipset for electrically connecting at least one peripheral device to the computer system; and a first extending port electrically connected to the system chipset for extending functionality of the motherboard, the first extending port comprising at least one first power management end set electrically connected to the system chipset of the computer system for transmitting at least one power management signal and at least one monitoring signal; and an extended board capable of electrically connecting to the motherboard for extending the functionality of the computer system, the extended board comprising:

a second extending port capable of electrically connecting to the first extending port for electrically connecting the extended board to the system chipset of the motherboard, wherein at least one end of the second extending port is in accordance with the specification of the first interface;

a second interface converter electrically connected to the at least one end of the second extending port for converting the first interface into a second interface;

at least one second standard communication interface slot electrically connected to the second interface converter for electrically connecting at least one peripheral device to the computer system, wherein the at least one second standard communication interface slot is in accordance with the specification of the second interface; and at least one switching circuit, for performing Hot-Plug control and power management of the at least one second standard communication interface slot, electrically connected to:

the second interface converter and the at least one second standard communication interface slot; and the at least one first power management end set through at least one second power management end set of the second extending port;

wherein the system chipset is capable of controlling and monitoring the Hot-Plug control and the power management of the at least one second standard communication interface slot with the at least one switching circuit, and the second interface converter is capable of controlling the at least one switching circuit with a protocol of the second interface to switch on or switch off the protocol and data signals of the at least one second standard communication interface slot when receiving the at least one power management signal.

* * * * *